Oct. 31, 1967  HOP LEE  3,349,946
ELECTRIC OUTLET BOX
Original Filed Aug. 9, 1965

INVENTOR
HOP LEE
BY William R. Piper
ATTORNEY

United States Patent Office 3,349,946
Patented Oct. 31, 1967

3,349,946
ELECTRIC OUTLET BOX
Hop Lee, 779 Commercial St.,
San Francisco, Calif. 94108
Original application Aug. 9, 1965, Ser. No. 478,040.
Divided and this application Oct. 4, 1965, Ser.
No. 492,419
1 Claim. (Cl. 220—3.2)

ABSTRACT OF THE DISCLOSURE

An electric outlet box in which the walls and bottom of the box are provided with one or more circular score lines defining knock-out discs. Each circular score line has spaced apart recesses in the disc portion to provide tongues that extend inwardly into the interior of the box. An anchor sleeve has a cylindrical portion of the same diameter as the circular score line and is provided with longitudinally extending grooves in this portion that receive the tongues. The grooves extend into an integral head of the anchor sleeve and prevent the head from rotating when the tongues are received therein.

---

An object of my invention is to provide an electric outlet box that is a division of my application filed on Aug. 9, 1965, on electric sockets mounted in an outlet box, Ser. No. 478,040.

The electric outlet box is provided with one or more knock-out discs in the four walls and bottom of the box. Inwardly extending and spaced apart tongues are arranged around the periphery of each knock-out disc. An anchor sleeve has an exteriorly threaded cylindrical portion that extends through the box opening provided when the knock-out disc is removed. The anchor sleeve has a head provided with recesses designed to receive the spaced apart tongues so that the head cannot rotate with respect to the box. This arrangement prevents the cylindrical portion from rotating when a nut is threaded onto the cylindrical portion for securing an end of a pipe or flexible conduit to the box.

The electric outlet box is simple in construction and is durable for the purpose intended.

Other objects and advantages will appear as the specification continues. The novel features of the invention will be set forth in the appended claim.

Drawing

For a better understanding of my invention, reference should be made to the accompanying drawing, forming part of this specification, in which.

While I have shown only the preferred form of my invention, it should be understood that various changes, or modifications, may be made within the scope of the annexed claim without departing from the spirit thereof.

Detailed description

Figure 1:
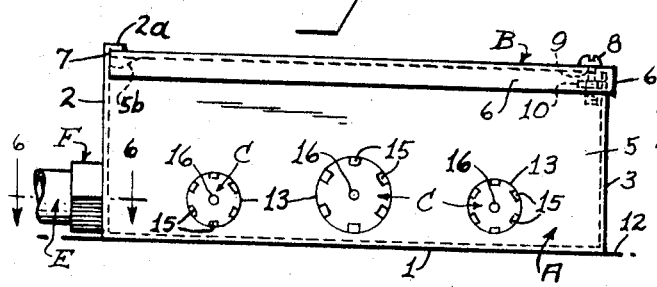
FIGURE 1 is a side elevation of the electric outlet box with the box cover in closed position.
Figure 2:
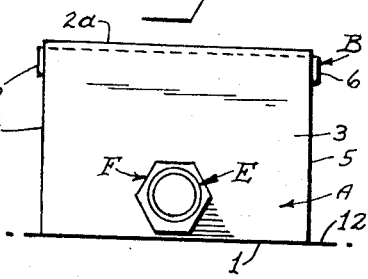
FIGURE 2 is an end elevation of FIGURE 1.

In carrying out my invention, I provide an electric outlet box indicated generally at A, and preferably made of metal, see FIGURES 1 and 2. The box has a lower wall 1, two end walls 2 and 3, and two side walls 4 and 5. The end wall 2 has an inwardly extending flange 2a that is spaced above the upper side edges 4a and 5a, and above the upper end edge 3a. The upper side edges 4a and 5a have recesses 4b and 5b disposed adjacent to the end wall 2 and partially underlying the flange 2.

Figure 3:
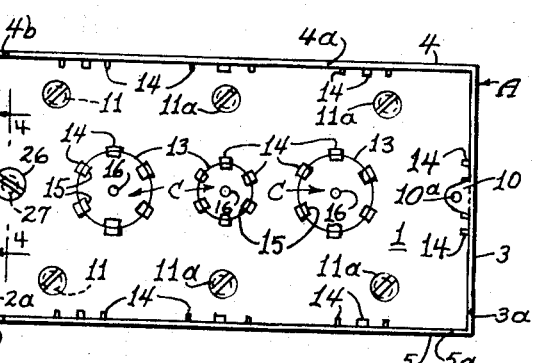
FIGURE 3 is a top plan view of FIGURE 1 with the box cover removed.

A removable box cover B has a flange 6 that extends around two sides 4 and 5 and the end 3 of the box A, while the other end 7 is designed to be inserted under the flange 2a of the box A so as to be held in place by the flange, see FIGURES 1 and 3. The cover B is held in closed position by a single screw 8 that has a reduced diameter shaft portion received in an opening 9 in the cover, see FIGURE 1, and a threaded portion receivable in a threaded opening 10a provided in the lug 10 that extends inwardly from the box end wall 3.

FIGURE 3 shows the box bottom wall 1 provided with a plurality of openings 11 for receiving screws 11a by means of which the box may be secured to a supporting surface 12 such as a wall. The box bottom wall 1, end walls 2 and 3 and side walls 4 and 5 are provided with knock-out discs for providing openings for receiving pipe or conduit ends that carry the electric wires. The side and end box walls have knock-out discs C of various sizes and these are formed at different places in the walls. The discs initially are integral with the box walls and have circular score lines 13 provided in the box walls for weakening the connection between the disc periphery and the adjacent wall surface. A plurality of spaced apart tongues 14 are struck inwardly from the circular edge 13 of the disc and leave spaced apart recesses 15 in the knock-out disc. The discs C also have center holes 16 for receiving the pointed end of a tool, not shown, that is used for knocking out one or more of the discs.

Figure 4:
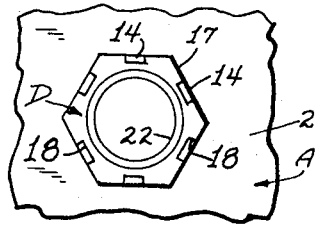
FIGURE 4 is a full size view of the head of an anchor sleeve used in connecting an electric pipe or conduit to the outlet box and is taken along the line 4—4 when looking in the direction of the arrows, in FIGURE 3.
Figure 6:
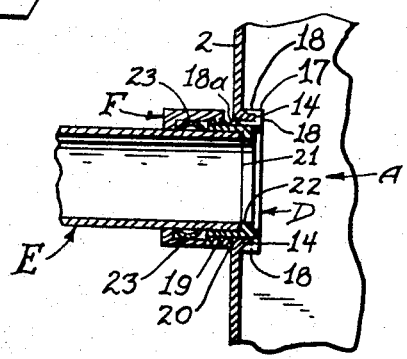
FIGURE 6 is a longitudinal section taken along the line 6—6 of FIGURE 1, and shows the anchor sleeve, gland nut, metal packing ring and electrical pipe or conduit, full size.

In FIGURE 6, I show the end wall 2 of the box A and a center knock-out disc C has been removed from the end wall leaving an opening surrounded by the inwardly extending spaced apart tongues 14. An anchor sleeve is shown at D in FIGURES 4, 5 and 6 and it has a hexagonal head 17 shown full size in FIGURE 4. The head is provided with recesses 18 that are designed to receive the inwardly extending tongues 14, see FIGURE 6. The recesses 18 register with the grooves 18a, see FIGURE 5, and these longitudinally extending grooves are provided in the exteriorly threaded cylindrical portion 19 of the anchor sleeve D.

FIGURE 6 shows the threaded portion 19 extending through the opening 20 in the end wall 2 that is formed when the knock-out disc C is removed from the end wall. A pipe E or electric conduit has one end 21 received in the cylindrical portion 19 of the anchor sleeve D and this pipe end abuts an inwardly extending annular flange 22 that is provided in the anchor sleeve. A metal packing ring 23, see FIGURE 6, encloses the pipe or conduit E and is moved up against the outer end of the anchor sleeve D. A gland nut F is now mounted on the pipe or conduit E and has an internally threaded portion for receiving the exteriorly threaded portion 19 of the anchor sleeve. A tightening of the nut F will cause the gland nut 23 to frictionally engage with the pipe or conduit E and secure it to the end wall 2.

The electric outlet box A is provided with three knock-out discs C on each of the two sides 4 and 5 and these knock-out discs may be of different diameters in order to receive pipes or electric conduits E of the desired size. Also the end wall 3 has a knock-out disc C and inwardly extending tongues 14 associated therewith, see FIGURE 3. The bottom wall 1 has knock-out discs C of different diameters and the circular score lines 13 which constitute the boundaries of these discs have inwardly extending tongues 14 associated therewith. The score lines 13 weaken the metal along circular lines separating the knock-out discs C from the adjacent wall area. The discs C can be readily removed by knocking them out.

It is possible to remove one or more of the knock-out discs C in the bottom wall 1, end walls 2 and 3 and the side walls 4 and 5. The present drawing only shows a knock-out disc removed in the end wall 2. The electrician determines where the incoming and outgoing wires are to be placed with reference to the outlet box A and then he removes the desired knock-out discs C to provide the openings for receiving the pipes or conduits that carry the electric wires.

Figure 5:
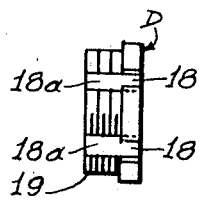
FIGURE 5 is a side elevation of the anchor sleeve shown full size.

Before the cylindrical portion 19 of the anchor sleeve D can be moved through the opening 20 that is provided by the removal of the knock-out disc C, the electrician must line up the grooves 18a in the portion 19, shown in FIGURE 5, with the tongues 14 that extend inwardly from the periphery of the opening 20. He then moves the anchor sleeve for bringing the nut or head 17 into contact with the inner surface of the outlet box wall 2. The tongues 14 will prevent the rotation of the anchor sleeve D in the opening 20 while the electrician rotates the nut F on the threaded portion 19 for connecting the pipe end 21 to the outlet box.

I claim:

In combination:

(a) an electric outlet box having a wall with at least one circular score line for defining the boundary of a knock-out disc;

(b) the portion of the wall lying adjacent to the circular score line having spaced apart tongues that extend inwardly into said box;

(c) an anchor sleeve having a cylindrical portion with an outer diameter that is the same as that of said circular score line, and having a head with spaced apart recesses in its periphery adapted to receive said tongues when said knock-out disc is removed from said box wall and said cylindrical portion is received in the wall opening thus provided, said cylindrical portion having longitudinally extending grooves in its outer surface that register with the recesses in said head;

(d) whereby said cylindrical portion can be inserted through the box wall opening, the longitudinal grooves receiving said fingers and guiding them into registration with the recesses in said head for preventing any rotation of said anchor sleeve in the wall opening.

References Cited

UNITED STATES PATENTS

| | | | |
|---|---|---|---|
| 1,272,919 | 7/1918 | Crawford | 151—41.74 |
| 2,241,293 | 5/1941 | Campbell | 285—203 |
| 2,250,685 | 7/1941 | Tiefenbacker et al. | 220—3.2 |

THERON E. CONDON, *Primary Examiner.*

J. R. GARRETT, *Assistant Examiner.*